(No Model.)
J. J. GREENOUGH.
UNIVERSAL JOINT.
No. 258,576. Patented May 30, 1882.
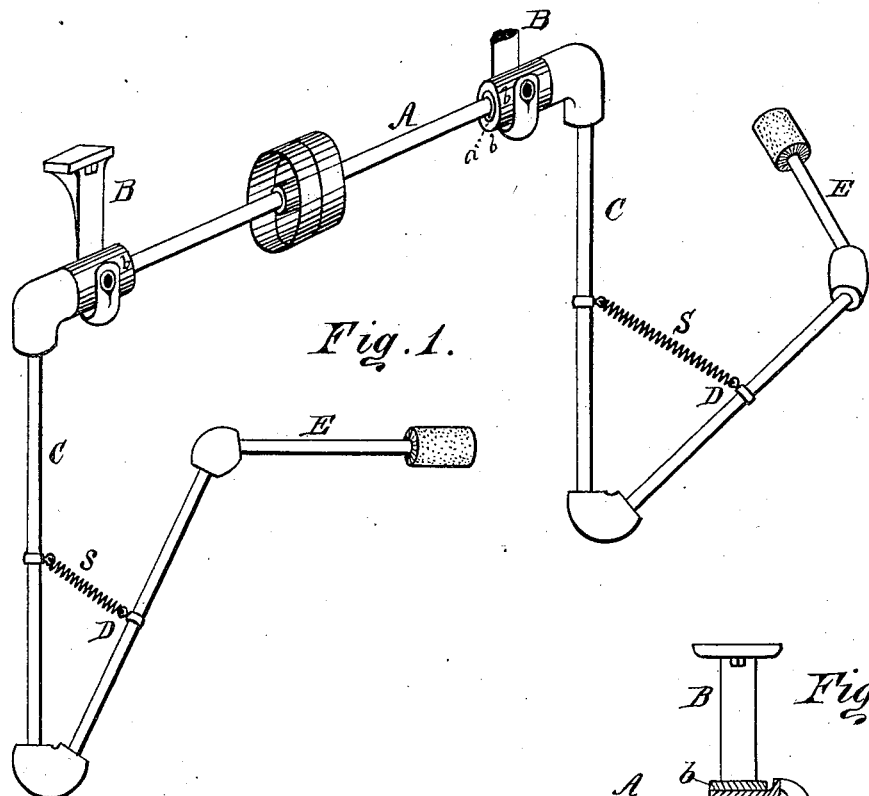
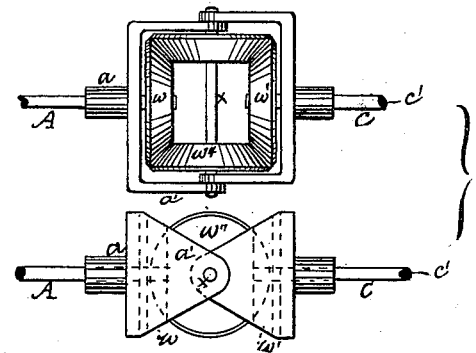
Witnesses:
C. K. Ellery
J. S. Ellery
Inventor:
J. J. Greenough

UNITED STATES PATENT OFFICE.

JOHN JAMES GREENOUGH, OF SYRACUSE, NEW YORK.

UNIVERSAL JOINT.

SPECIFICATION forming part of Letters Patent No. 258,576, dated May 30, 1882.

Application filed April 18, 1882. (No model.)

*To all whom it may concern:*

Be it known that I, JOHN JAMES GREENOUGH, a citizen of the United States, now residing in the city of Syracuse, Onondaga county, and State of New York, have invented certain Improvements in Constructing Jointed Shafts for Driving Brushes and other Working-Tools, of which the following is a specification.

Heretofore I have obtained Letters Patent for universally-jointed shafts for sundry purposes, which in practice have in some particulars been found defective in their mode of construction, that by great expense of time and money I have at last obviated by means of several important additions and improvements in construction, of which the following is a description, referring to the accompanying drawings, in which—

Figure 1 is a general view of the apparatus. Fig. 2 is a detail of the first joint or coupling in which the driving-shaft runs, with the hanger; Fig. 3, my new bevel-geared universal joint.

The main or driving shaft A (see Figs. 1 and 2) is supported in ordinary hangers, B, having adjustable collars $b$ therein. Into these collars $b$ a box or bearing, $a$, is fitted so as to turn in said collars. This box $a$ forms the bearing in which revolves the shaft A, having the gearing that is to drive the second shaft, $c'$, affixed to its end. The bearing $a$ has projections $a'$ from it on each side of the gear-wheel on the shaft, forming the coupling by which the second shaft is suspended without bearing on shaft A. This is effected by means of a swivel-joint, $c$, jointed to bearing $a$, in which a tube, C, is fitted with a flange, $c^2$, on its end, that rests in a recess in joint $c$, by means of which it is supported and can freely turn. This tube has bearings in its ends, that form journal-boxes for the shaft $c'$ to run in, the tube covering the shaft from the gear on one end of the shaft to that on the other. The lower end of the tube fits into the socket of the next coupling at the opposite end to the swivel, to which it is firmly fastened, thus causing that coupling to sustain the next without any bearing upon the shaft. The gearing used in these shaft-sustaining couplings and tubes may be the semi-spherical gear heretofore patented by me, or a combination of bevel-gear that forms my new universal joint, devised for the purpose of connecting the ends of two shafts together with a universal movement, as follows: On the end of the main shaft (see Fig. 3) a bevel-gear, $w$, is keyed, and a like one, $w'$, on the end of the second shaft. Into these one or two other bevel-wheels, $w''$, gear at right angles thereto, by which they are connected. These last may be of the same size or different from those on the shafts, their arrangement being clearly shown in the plan and side view, Fig. 3. Two arms, $a'$, extend out from bearing $a$ on either side of the gear $w$ on the shaft to the center of the side gear-wheel, $w''$, where they are jointed to similar arms on the swivel-joint $c$, and form the coupling by a rod, $x$, or axis passing through from one side to the other, and serving as a journal on which the side gear, $w''$, turns. Thus arranged and coupled together the parts form a universal joint, very compact and perfect, the swivel before described permitting the range of motion all around the circle. The other joints are made in substantially the same way as before indicated.

In the drawings, Fig. 1, I show three joints between the driving-shaft and the working brush or tool, which will generally be found sufficient for all practical purposes, representing, as they do, the joints of a human arm. To the first pendent joint, $c$, Fig. 1, representing the upper arm, is attached a spring, $s$, which unites it with the forearm D, so as to hold the forearm up, and relieves the operator of much of the weight of the working-tool. The connections at the elbow-joint, being so made as not to swivel, prevent this spring from becoming twisted around the tubes C D, to which it is affixed when the forearm is turned to the right or left horizontally. At the handle or wrist-joint E the coupling swivels on the forearm D, by which the brush or other tool can be turned in any direction. The pendent arms $c$ are coupled one at each end of the shaft A, by which means the brushes or other tools are caused to revolve in opposite directions when brought in contact with an object between them, so that a horse standing between them can be properly brushed without reversing the motion of shaft A.

Having thus fully described my improved jointed shafting and its suspenders, I claim—

1. The manner of suspending the shaft of the upper arm coupled with the main or driving shaft by means of the coupling-joint, in which the main shaft A turns, resting in and being supported by the hanger independent of the main shaft, as and for the purposes specified.

2. The combination of the upper arm and forearm connected by a spring, s, as herein specified, to assist in holding up the forearm at the wrist-joint.

3. The combination of the swiveling shoulder and wrist-joint with the non-swiveling elbow-joint, as and for the purposes specified.

4. The bearings rigidly affixed in the tubes surrounding and forming the boxes in which the shafts turn and in which they are supported independent of the couplings, as herein described.

5. The bevel-gear arranged and combined as herein specified, in combination with the couplings forming a universal joint, in the manner and for the purposes specified.

6. The combination of two pendent shafts with the shaft A, one at each end thereof, so as to cause the brush or other tool to rotate in opposite directions, as and for the purposes specified.

JOHN JAMES GREENOUGH.

Witnesses:
JOHN JOHNSON,
ABEL WHITE.